US010057728B2

(12) United States Patent
Lei et al.

(10) Patent No.: US 10,057,728 B2
(45) Date of Patent: Aug. 21, 2018

(54) METHOD AND APPARATUS FOR WIRELESS VEHICLE LOCATION ASSISTANCE

(71) Applicant: FORD GLOBAL TECHNOLOGIES, LLC, Dearborn, MI (US)

(72) Inventors: Oliver Lei, Windsor (CA); Perry Robinson MacNeille, Lathrup Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/291,779

(22) Filed: Oct. 12, 2016

(65) Prior Publication Data

US 2018/0103354 A1   Apr. 12, 2018

(51) Int. Cl.
| | | |
|---|---|---|
| H04W 24/00 | (2009.01) | |
| H04W 4/04 | (2009.01) | |
| H04W 4/00 | (2018.01) | |
| H04W 4/02 | (2018.01) | |
| G01S 5/02 | (2010.01) | |
| H04W 4/80 | (2018.01) | |

(52) U.S. Cl.
CPC ........... *H04W 4/046* (2013.01); *G01S 5/0252* (2013.01); *H04W 4/008* (2013.01); *H04W 4/023* (2013.01); *H04W 4/80* (2018.02); *H04W 4/02* (2013.01)

(58) Field of Classification Search
CPC ..... H04W 4/046; H04W 4/008; H04W 4/023; H04W 4/02; H04W 4/04; G01S 5/0252
See application file for complete search history.

(56) References Cited

U.S. PATENT DOCUMENTS

| | | | | |
|---|---|---|---|---|
| 8,223,073 B2* | 7/2012 | Berntsen | ............... | H04L 37/086 342/432 |
| 2007/0290819 A1* | 12/2007 | Teshima | .................. | B60R 25/24 340/426.19 |
| 2010/0308961 A1* | 12/2010 | Ghabra | .................... | B60R 25/00 340/5.61 |
| 2012/0244877 A1* | 9/2012 | Margalef | .............. | G01S 5/0252 455/456.1 |

(Continued)

FOREIGN PATENT DOCUMENTS

CN          104244183 A       12/2014

OTHER PUBLICATIONS

"Find My Car Smarter" Jun. 24, 2016, 3 pages, http://www.findmycarsmarter.com/index.html.

*Primary Examiner* — Barry W Taylor
(74) *Attorney, Agent, or Firm* — Jennifer Stec; Brooks Kushman P.C.

(57) ABSTRACT

A system includes a processor configured to determine that a vehicle is in a parked state. The processor is also configured to detect a user device wireless signal, at one or more vehicle antennas. The processor is further configured to determine a primary return vector antenna based on the detected wireless signal and periodically broadcast a vehicle wireless signal from the one or more antennas, wherein if there is more than one antenna, the processor is configured to broadcast the signal more frequently from the primary return vector antenna. A mobile device can act responsively to the received signals, providing an indicator assisting in directional vehicle location.

9 Claims, 3 Drawing Sheets

(56) References Cited

U.S. PATENT DOCUMENTS

| | | | |
|---|---|---|---|
| 2014/0232570 A1* | 8/2014 | Skinder | G01C 21/165 340/989 |
| 2015/0235486 A1 | 8/2015 | Ellis et al. | |
| 2016/0320469 A1* | 11/2016 | Laifenfeld | G01S 5/0284 |

* cited by examiner

METHOD AND APPARATUS FOR WIRELESS VEHICLE LOCATION ASSISTANCE

TECHNICAL FIELD

The illustrative embodiments generally relate to a method and apparatus for wireless vehicle location assistance.

BACKGROUND

A situation experienced by many driving adults has been the scenario where a driver parks a vehicle at a location, enters a store or mall, and subsequently can barely remember where the vehicle is parked. Also, parking a vehicle in a relatively empty lot, only to return to find the lot full of other vehicles, can result in substantial confusion as to where a driver parked.

A common solution to this problem is for a driver to press the "lock" button on a key fob, which results in the vehicle sounding a horn or alarm, or flashing lights, if the vehicle is close in proximity. If the vehicle is too far away, however, or if multiple users are simultaneously attempting to locate vehicles in this manner, this solution may not achieve the desired results.

Another attempted solution to this problem includes the vehicle reporting coordinates to a mobile device, once the vehicle is parked, and the mobile device user using the coordinates to find the vehicle. This may work well in certain scenarios, but if the phone is off when the vehicle is parked, or other communication errors ensue, the user may rely on this system only to discover that the coordinates were never logged.

SUMMARY

In a first illustrative embodiment, a system includes a processor configured to determine that a vehicle is in a parked state. The processor is also configured to detect a user device wireless signal, at one or more vehicle antennas. The processor is further configured to determine a primary return vector antenna based on the detected wireless signal and periodically broadcast a vehicle wireless signal from the one or more antennas, wherein if there is more than one antenna, the processor is configured to broadcast the signal more frequently from the primary return vector antenna.

In a second illustrative embodiment, a processor is configured to receive a wireless signal at a plurality of mobile device antennas. The processor is also configured to determine a received wireless signal strength at each antenna. The processor is further configured to determine a time delay between wireless signal reception times at each antenna. Also, the processor is configured to determine a received wireless signal polarization at each antenna and combine the signal strengths, time delays and polarizations to determine a distance and directionality from a mobile device location to a vehicle broadcasting the wireless signal.

In a third illustrative embodiment, a computer implemented method includes periodically broadcasting a vehicle location signal via the plurality of antennas, responsive to a vehicle-based determination of one of a plurality of wireless vehicle antennas corresponding to a user exit vector, wherein the broadcasting includes broadcasting from the antenna corresponding to the user exit vector with increased frequency.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
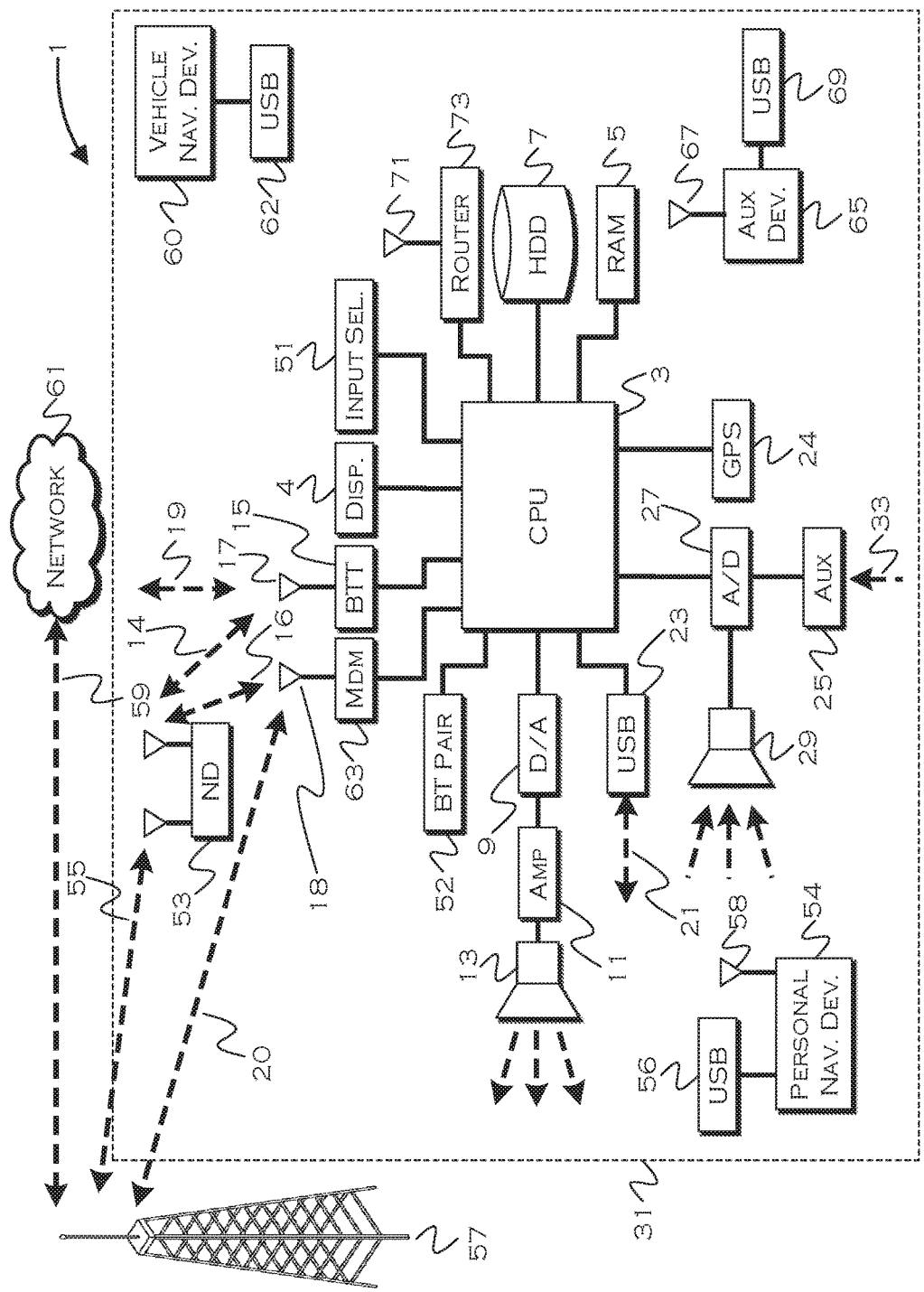
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connections. Auxiliary device 65 may include, but are not limited to, personal media players, wireless health devices, portable computers, and the like.

Also, or alternatively, the CPU could be connected to a vehicle based wireless router 73, using for example a WiFi (IEEE 802.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Many people have experienced the frustration of a misplaced vehicle. In addition to causing time delays, a lost vehicle can result in significant inconvenience and burden, especially if carrying a load of heavy packages in inclement weather. While GPS-based vehicle location solutions may assist in finding a vehicle, to some extent, this process can suffer limitations due to communication of the initial coordinates and, perhaps more significantly, when in a parking garage the coordinates may not be available or useful because of the multiple levels of the garage.

The illustrative embodiments propose utilization of a wireless signal, such as BLUETOOTH low energy (BLE), to communicate with a mobile device and identify a vehicle location. This solution is usable underground in the absence of GPS, and does not require recordation of information on a mobile device (such as vehicle coordinates) when the vehicle is parked. While BLE is used in the illustrated examples, similar wireless technology providing similar detectability can also be used. BLE devices can be powered by a coin battery that will last for a year and can even be simply glued onto the vehicle. Wires to the vehicle are only necessary to support applications that use CAN bus data, in this instance.

A vehicle manufacturer may provide a plurality of BLE antennas to a vehicle for use in conjunction with the illustrative embodiments (and for other BLE related solutions). Similarly, a smart phone or other wireless device may have multiple BLE antennas for receiving BLE signals. In one example, the vehicle has four directional BLE antennas facing outwards in four directions, at approximately 90 degree angles to each other, so that the entire circumference of the car is addressed. These antenna may be polarized. A polarized antenna transmits a polarized signal and receives a polarized signal with the same polarization. Right hand circularly polarized waves reflect into left-hand polarized waves and vice versa. Antenna elements designed to receive right-hand circularly polarized carriers will filter out reflected signals from a right-hand circularly polarized transmitter. If the receiver is switched from right to left handed polarization (by switching antenna elements) it will only receive reflected signals. If the direct signal is missing (usually because there is an obstruction) the choice can be made to navigate by reflected signals until a direct signal is received.

The vehicle, through previous paring or setup, may also know a mobile device's BLE identity (and vice versa). In the illustrative examples, although not necessary (in case a device is powered down when a user leaves the vehicle), the vehicle will track the direction in which the user leaves the vehicle. This can be done by tracking communication between the device and a BLE antenna as the user walks away. The vehicle can then selectively and periodically send out BLE signals from each antenna for detection by the user when the user returns, in some cases sending more frequent signals through the antenna corresponding closest to the direction in which the user walked away.

An application running on the mobile device detects the signal from the vehicle BLE antenna as the user approaches the vehicle and comes within signal range. A mobile device may have three directional BLE antennas provided thereto, for example. Depending on which antenna receives the signal (or receives the signal first), the application can determine the direction of the vehicle. The application may be able to determine an approximate distance based on signal strength, and polarization of the signal helps the application to determine if the signal was received directly or via reflection. This information combined can provide sufficient data for the application to present indicia of vehicle direction from a present location, as well as possible distance to vehicle. If exact distance cannot be calculated, the mobile device can use varying indicia (such as a brighter or dimmer indicia, gradual color change, a number displayed and changing, a displayed line thickness changing, etc.) to inform a user that a signal is getting weaker or stronger.

This solution should work even in underground garages, where external (e.g., GPS) wireless signals are not present. By providing directionality and distance, an application can assist a user in finding a vehicle quickly. This also avoids any concerns about alerting a potential assailant that a person is walking to a vehicle identified by flashing lights and a horn (if the person is using the "push the lock/alarm button" method to find a vehicle).

Figure 2:
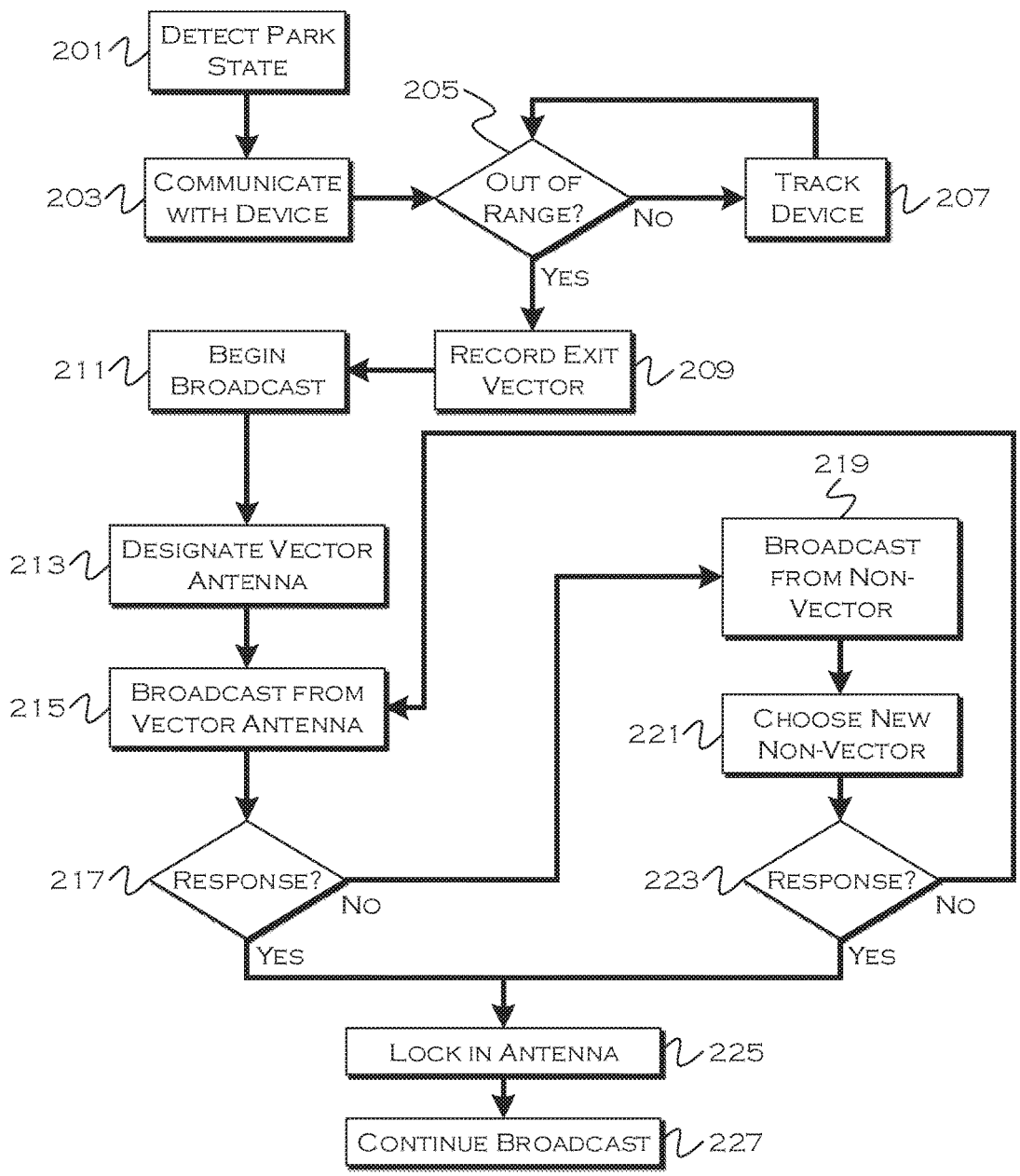
FIG. 2 shows an illustrative process for vehicle reporting configuration.

FIG. 2 shows an illustrative process for vehicle-reporting configuration. In this example, the process attempts to determine a primary direction in which to broadcast a detection signal. The process receives a parked vehicle indicator, which, in this example, includes a user placing the vehicle into park 201. Other indicia can include, for example, reaching a destination on a navigation application and/or a driver door opening and closing.

The process then attempts to communicate with a user device 203, assuming such communication is not already established through a device-pairing. An application running on the device to assist in vehicle location may recognize the park-state and instruct communication with the vehicle computer as well, in order to facilitate the setup.

The vehicle communicates 207 with the application running on the device as the device moves out of range 205. In other examples, the vehicle may simply detect a signal from the device at one or more antennas. The process may designate the last antenna to detect the signal or the antenna receiving the strongest signal as the primary return vector antenna 209.

Once the device is out of range, or at any other reasonable time, the process begins to broadcast signals from the vehicle antennas. The device, when in range, receives these signals and an application on the device processes the signals to determine vehicle distance and/or directionality. The process begins, in this example, by broadcasting a signal from a primary return vector antenna 215, which could be, for example, the last antenna to receive a device signal or the antenna to receive the strongest device signal before the device moved out of range.

If there is no response received from the device, the process may wait a suitable period of time and then broadcast a signal from a non-primary antenna (one of the other antennas) 219. A new non-return-vector antenna is then chosen for a later broadcast (if needed), and the process again waits for a response 223.

It is possible to identify the vehicle through BLE signal transmission without interacting with the device (a response)

as well. The response allows for focusing signal broadcast, but is not necessary to use BLE signals broadcast by the vehicle to identify a vehicle location.

In this example, the process loops between broadcasting from the primary return vector antenna and a different one of the other antennas, such that the majority of the signal broadcasts are originated from the primary return vector antenna. Any reasonable variation strategy may be used, if variation is even desired at all.

BLE in this application is primarily a beaconing protocol supported by BLE advertising messages that are DSSS modulated. Messages are transmitted, but no acknowledgement is expected. Messages received are not acknowledged. Because the beacon messages are short, the coherence time is improved in multipath environments (reflections have lower impact because the message received by the direct path is more likely to have been fully received before reflected signals arrive).

The range is typically estimated using the received signal strength index (RSSI) that is reported by the radio to software applications. If the signal is weak the RSSI is low, if it is strong the RSSI is large. RSSI can be reported per antenna as below.

Also, in this example, the user device responds once the device detects the BLE signal from the vehicle. The vehicle can use the response to lock-in a broadcast antenna 225, which is presumably the last antenna to broadcast the BLE signal. In this example, the process provides sufficient time delay between signal broadcasts such that a response will clearly identify which signal to used based on a last-broadcast signal. In other examples with more frequent broadcasts, the broadcast signal may include some indicia of which antenna was used to send the signal, so the device can identify via the response which signal was detected.

Once the vehicle has locked-in the appropriate antenna, the process may only send signals via that antenna 227 (until, for example, a door opens or other entry-event is detected). If the driver wanders out of signal range, the process can resume broadcast over all antennas or selective antennas likely to represent the current driver location. Loss of signal can be detected, for example, if the vehicle no longer detects a signal from the user device, or if a user device stops responding if the process expects periodic responses while the user approaches the vehicle.

Figure 3:
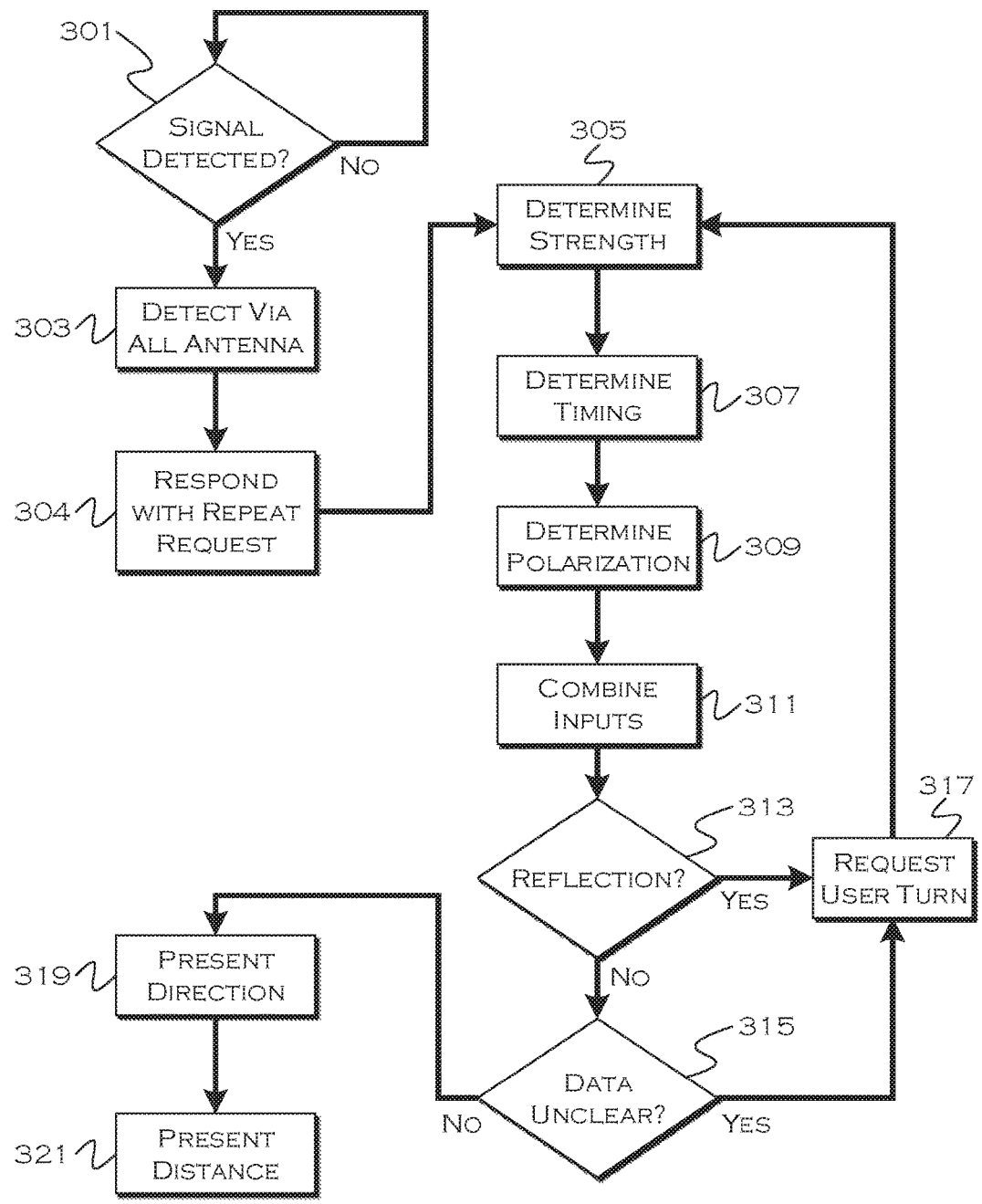
FIG. 3 shows an illustrative process for responding to reported vehicle location signals.

FIG. 3 shows an illustrative process for responding to reported vehicle location signals. In this illustrative example, the process (executing on the mobile device) searches for a signal from the vehicle 301. Once the process detects a signal, BLE in this case, the process determines if the signal is detected by all device antennas 303.

In this example, since the process responds with a request to lock-in the signal transmission, the process responds to the detection of the signal by sending a request to the vehicle to continue to use the current broadcast antenna. This response does not have to be an explicit request; it can also be a simple response to detecting the signal.

The process then determines which device antenna is receiving the strongest signal 305. Assuming this is not a reflected signal, that antenna likely is the most proximate to the vehicle, and so the process can establish initial directionality to the vehicle. Based on which antenna receives the second strongest non-reflected signal, the device can determine a second direction vector, and the two combined can establish general directionality of the vehicle. The device also determines timing differentials in signal reception 307 and this information can be used to refine the direction to the vehicle. If one or more of the received signals is a reflected signal, the process can use this polarization information to determine directionality as well, by recognizing that the signal source is away from the direction of the reflected signal.

At least signal strength and timing can also be used to approximate a distance to the vehicle, for non-reflected signals. And, as soon as a user moves the mobile device, the process can use the variance in the signal variables to refine the directionality and/or distance. All of these inputs are combined 311 to produce the desired directionality 319 and distance indicia 321 (or distance display). If one or more signals is reflected 313, the process may instruct the user to rotate away from the reflected signal 317, which the process can also achieve by placing the directionality indicia displayed on the device in a direction away from the reflected signal.

The process can continue receiving signals and displaying the appropriate indicia until the user reaches the vehicle and enters the vehicle or disables the application, for example.

While the illustrative examples refer to vehicles with four directional antenna and mobile devices with three directional antennae, more or fewer directional antennas could be used at either device, increasing or decreasing precision and detectability, respectively. Through detection of signal characteristics and processing of those characteristics, a user can quickly locate the direction to and distance to a vehicle. Since the vehicle (in this example), periodically broadcasts the detection signals, no explicit connection needs to be established to the vehicle to begin broadcast. In other examples, some longer range form of communication may be used (e.g., cellular) to instruct the vehicle to begin broadcast. Which solution is used may depend on the trade off in power preservation represented by responsive signal broadcast (responsive to a request to begin) vs. perpetual periodic signal broadcast, although if the power used in the periodic broadcast is insignificant in impact, that particular aspect of the solution benefits from not requiring the vehicle to be able to receive the longer-range communication (if the vehicle is buried in a deep garage, for example).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
detect a user device wireless signal, at a plurality of vehicle antennas;
determine a primary return vector antenna based on the detected wireless signal;
periodically broadcast a vehicle wireless signal from the plurality of antennas;
detect communication from the user device confirming a received vehicle wireless signal; and
begin responsively broadcasting most frequently from an antenna that sent the vehicle wireless signal received by the device.

2. The system of claim 1, wherein the processor is configured to detect the user wireless device signal after a driver door has opened and closed.

3. The system of claim 1, wherein the user device wireless signal is a BLUETOOTH low energy signal.

4. The system of claim 1, wherein the vehicle wireless signal is a BLUETOOTH low energy signal.

5. The system of claim 1, wherein the processor is configured to detect loss of communication with the user device, following the responsively broadcasting most frequently, and begin periodically broadcasting signals from more than one of the plurality of antennas responsive to the loss of communication.

6. The system of claim 5, wherein the processor is configured to, upon periodic broadcasting, periodically broadcast signals from the antenna that sent the vehicle wireless signal received by the device and an antenna most circumferentially proximate to each side of the antenna that sent the vehicle wireless signal received by the device.

7. A computer-implemented method comprising:
responsive to a vehicle-based determination of one of a plurality of wireless vehicle antennas corresponding to a user exit vector, periodically broadcasting a vehicle location signal via the plurality of antennas with an exit-vector antenna broadcasting with increased frequency;

detecting communication from a user device confirming a received vehicle location signal; and changing increased frequency broadcasts to an antenna that sent the vehicle wireless signal received by the device.

8. The method of claim 7, wherein the method further comprises:
determining the antenna corresponding to the user exit vector based on which of the plurality of antennas last detects a wireless signal from a user device before none of the antennas detect the wireless signal.

9. The method of claim 7, wherein the method further comprises:
determining the antenna corresponding to the user exit vector based on which of the plurality of antennas detects a strongest wireless signal from a user device before none of the antennas detect the wireless signal.

\* \* \* \* \*